US010977575B2

(12) United States Patent
Jayaraman

(10) Patent No.: US 10,977,575 B2
(45) Date of Patent: Apr. 13, 2021

(54) MACHINE LEARNING AUTO COMPLETION OF FIELDS

(71) Applicant: ServiceNow, Inc., Santa Clara, CA (US)

(72) Inventor: Baskar Jayaraman, Fremont, CA (US)

(73) Assignee: ServiceNow, Inc., Santa Clara, CA (US)

(*) Notice: Subject to any disclaimer, the term of this patent is extended or adjusted under 35 U.S.C. 154(b) by 849 days.

(21) Appl. No.: 15/674,353

(22) Filed: Aug. 10, 2017

(65) Prior Publication Data

US 2018/0322414 A1 Nov. 8, 2018

Related U.S. Application Data

(60) Provisional application No. 62/501,646, filed on May 4, 2017, provisional application No. 62/501,657, filed (Continued)

(51) Int. Cl.
*G06N 20/00* (2019.01)
*G06N 7/00* (2006.01)
(Continued)

(52) U.S. Cl.
CPC .......... *G06N 20/00* (2019.01); *G06F 40/174* (2020.01); *G06F 40/30* (2020.01); *G06F 40/40* (2020.01);
(Continued)

(58) Field of Classification Search
None
See application file for complete search history.

(56) References Cited

U.S. PATENT DOCUMENTS 6,321,229 B1 11/2001 Goldman
6,609,122 B1 8/2003 Ensor
(Continued)

FOREIGN PATENT DOCUMENTS

EP 3142028 A2 3/2017
WO 2017003889 A1 1/2017

OTHER PUBLICATIONS

Davison, The Design and Evaluation of Web Prefetching and Caching Techniques, Doctoral Thesis, Rutgers University, 2002, pp. 1-329 (Year: 2002).*

(Continued)

*Primary Examiner* — Wilbert L Starks
(74) *Attorney, Agent, or Firm* — Fletcher Yoder PC

(57) ABSTRACT

Systems and methods for using a mathematical model based on historical natural language inputs to automatically complete form fields are disclosed. An incident report may be defined with a set of required parameter fields such as category, priority, assignment, and classification. Incident report submission forms may also have other free text input fields providing information about a problem in the natural vocabulary of the person reporting the problem. Automatic completion of these so-called parameter fields may be based on analysis of the natural language inputs and use of machine learning techniques to determine appropriate values for the parameter fields. The machine learning techniques may include parsing the natural language input to determine a mathematical representation and application of the mathematical representation to "match" historically similar input. Once matched the parameter values from the historically similar input may be used instead of generic default values.

20 Claims, 6 Drawing Sheets

Related U.S. Application Data on May 4, 2017, provisional application No. 62/502,244, filed on May 5, 2017, provisional application No. 62/502,258, filed on May 5, 2017, provisional application No. 62/502,308, filed on May 5, 2017, provisional application No. 62/502,440, filed on May 5, 2017.

(51) Int. Cl.
*G06Q 10/00* (2012.01)
*G06F 40/30* (2020.01)
*G06F 40/40* (2020.01)
*G06F 40/174* (2020.01)
*G06N 5/04* (2006.01)

(52) U.S. Cl.
CPC ............ *G06N 7/005* (2013.01); *G06Q 10/00* (2013.01); *G06N 5/04* (2013.01)

(56) References Cited

U.S. PATENT DOCUMENTS

| | | | |
|---|---|---|---|
| 6,816,898 B1 | 11/2004 | Scarpelli | |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,685,144 B1 | 3/2010 | Katragadda | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,229,800 B2 | 1/2016 | Jain et al. | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 2011/0029862 A1 | 2/2011 | Scott et al. | |
| 2014/0081925 A1 | 3/2014 | Haeberle et al. | |
| 2014/0108308 A1 | 4/2014 | Stout et al. | |
| 2015/0193693 A1 | 7/2015 | Vasseur et al. | |
| 2016/0217119 A1 | 7/2016 | Dakin et al. | |
| 2016/0217124 A1 | 7/2016 | Sarikaya et al. | |
| 2017/0091320 A1 | 3/2017 | Psota et al. | |

OTHER PUBLICATIONS

Skantze, Error Handling in Spoken Dialogue Systems: Managing Uncertainty, Grounding and Miscommunication, Doctoral Thesis, 2007, pp. 1-207 (Year: 2007).*

Extended European Search Report for European Application No. 18170672.2 dated Sep. 26, 2018; 7 pgs.

Australian Office Action for Australian Application No. 2017236026 dated Aug. 9, 2018; 10 pgs.

Mario Sixtus: "Das Netz erfindet sich neu: Ein Striefzug durch das Web 2.0"; CT Magain Fuer Compurter Technik, Heise Zeitschriften Verlad, Hanover, DE, vol. 2006, No. 5, Feb. 20, 2006.

Extended European Search Report for EP Application No. 17194231.1 dated May 4, 2018; 10 pgs.

DnI Institute, Confusion matrix and Cost Matrix, published on Mar. 21, 2016 (online article), retrieved from the Internet (Wayback Machine) on Jan. 11, 2019; URL:https://web.archive.org/web/20160621220317/http://dni-institutein/blogs/confusion-matrix-and-cost-matrix/>.

Office Action for Australian Patent Application No. 2017236026 dated Jan. 14, 2019; 9 pgs.

Kadar et al, "Automatic Classification of Change Requests for Improved IT Service Quality", IEEE Xplore Digital Library, 2011 Annual SRII Global Conference, pp. 1-10, https://ieeexplore.ieee.org/document/5958118, Apr. 2, 2011.

Office Action for Canadian Patent Application No. 3,003,617, dated Apr. 8, 2020; 4 pgs.

* cited by examiner

MACHINE LEARNING AUTO COMPLETION OF FIELDS

CROSS REFERENCE TO RELATED APPLICATIONS

This application claims priority to U.S. Provisional Application No. 62/501,646 filed May 4, 2017, entitled "Service Platform and Use Thereof," by Lucinda Foss, et al. for all purposes, the contents of which are incorporated herein by reference in its entirety. This application also claims priority to U.S. Provisional Application No. 62/501,657 filed May 4, 2017, entitled "Service Platform and Use Thereof," by Tony Branton, et al. for all purposes, the contents of which are incorporated herein by reference in its entirety. This application also claims priority to U.S. Provisional Application No. 62/502,244 filed May 5, 2017, entitled "Service Platform and Use Thereof," by Manjeet Singh, et al. for all purposes, the contents of which are incorporated herein by reference in its entirety. This application also claims priority to U.S. Provisional Application No. 62/502,258 filed May 5, 2017, entitled "Service Platform and Use Thereof," by Sarup Paul, et al. for all purposes, the contents of which are incorporated herein by reference in its entirety. This application also claims priority to U.S. Provisional Application No. 62/502,308 filed May 5, 2017, entitled "Service Platform and Use Thereof," by Adar Margalit, et al. for all purposes, the contents of which are incorporated herein by reference in its entirety. This application also claims priority to U.S. Provisional Application No. 62/502,440 filed May 5, 2017, entitled "Machine Learning Auto Completion of Fields," by Baskar Jayaraman, et al. for all purposes, the contents of which are incorporated herein by reference in its entirety. This application is also related to U.S. patent application Ser. No. 15/674,379 filed concurrently herewith, entitled "Model Building Architecture and Smart Routing of Work Items," by Debu Chatterjee et al., which is incorporated by reference for all applicable purposes in its entirety.

TECHNICAL FIELD

Embodiments described herein generally relate to cloud computing and in particular to machine learning and predictive intelligence to automatically supply values based on natural language input analysis. Analysis may be performed by parsing and processing the natural language input; comparing information determined by parsing and processing against a model built using historical data; and determining a value and confidence level for a proposed target value. The proposed target value may be used to automatically provide an input having a higher accuracy and usefulness as opposed to a default value. Techniques may be enhanced by using historical data that adheres to a common vocabulary with the natural language input.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, support personnel may be asked to deal with higher expectations of response time to infrastructure issues. The goal of most business systems, and cloud computing systems in particular, is very high availability. Accordingly, users of business systems have grown accustom to nearly 100% availability of all business functions. One important aspect of maintaining such high availability is the ability to accurately and quickly address incident reports. Incident reports may also be thought of as help desk tickets. In general, a help desk receives information from users and automated monitors about infrastructure abnormalities. For example, a help desk may receive an incident report from a customer that they cannot log into their email system, or a customer may complain that a service is down or running slowly. One common way for a user to provide an incident report is for a user to complete a web based form describing the complaint/issue. In general, the web based form has a plurality of fields with some fields being completed in natural language (e.g., free flow text in the user's own words) and others being selected from a pre-determined set of applicable values. The pre-determined set of applicable values is generally presented in a drop-down selection box where a user may only select from the pre-determined set. Generic default values may be provided to allow the user to not have to select every required field. However, generic default values will likely not be accurate for all cases and therefore may lead to inefficiencies in addressing the reported problem. The disclosed techniques for automatic completion of fields address these and other issues.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
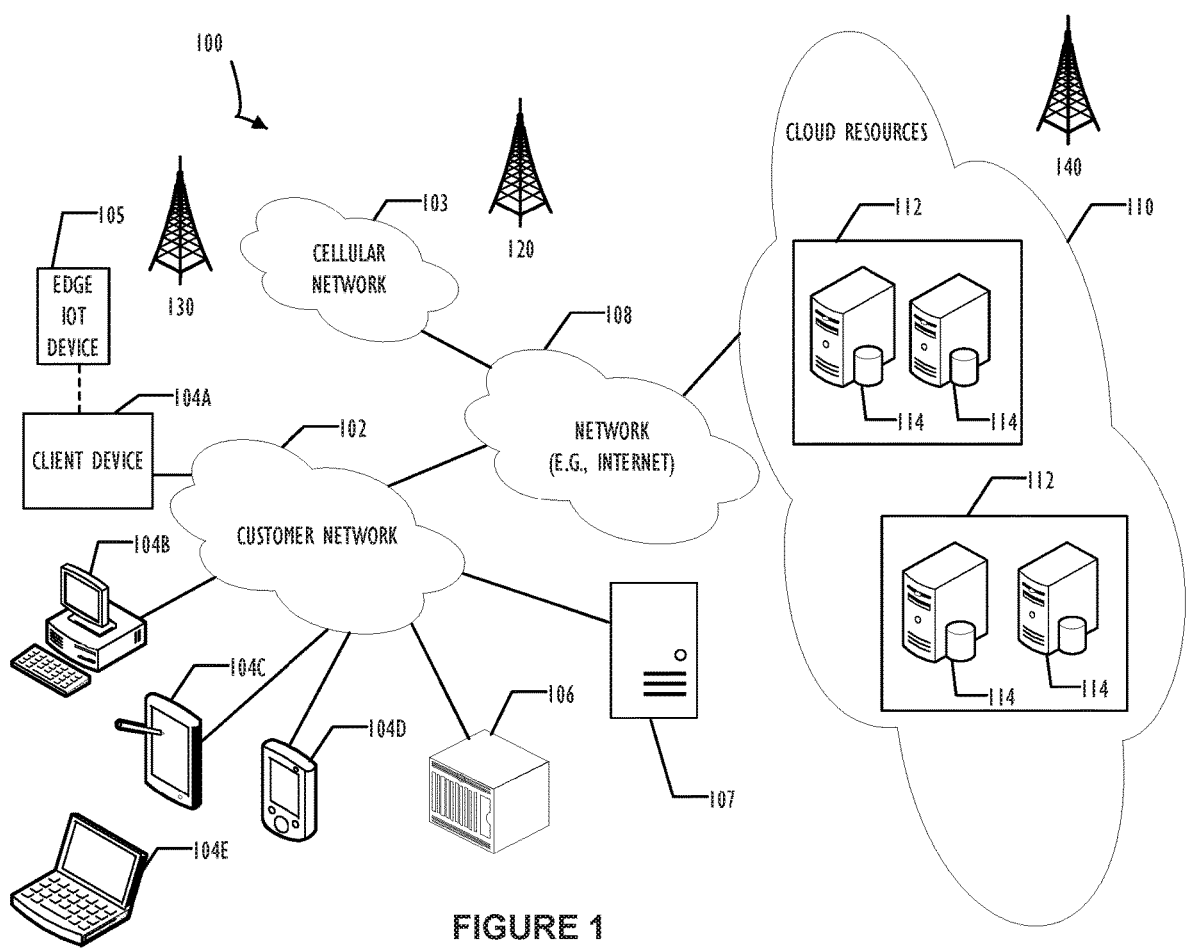
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Incident reports typically have multiple attributes that may be used to facilitate processing (e.g., corrective action) of the incident report. For example, these attributes may include, but not be limited to, priority, category, classification, and assignment. Priority may be used to determine an order in which to dedicate resources for resolution. Category may be used to group incidents that are similar to each other. Classification may be used to identify a class of incident (e.g., desktop, server, mobile device, etc.). Assignment may be used to determine a work group responsible for correcting the incident. These attributes are typically set for each incident and are typically allowed to be selected from a group of pre-defined set of values. For example, the priority may be restricted (in some systems) to numerical values between 1 and 5. Prior art systems may have default values for these attributes and/or require a user selection to set an initial value. Disclosed embodiments improve on prior art systems, at least because disclosed embodiments incorporate one or more additional techniques for automatically assigning initial values. In one embodiment, machine learning techniques are used. For example, historical data may be collected, processed, and organized into a predictive model. The predictive model may then be used to determine an initial value for a target attribute based in part on information entered into other fields of the incident report. More details of using historical data and applied machine learning techniques to automatically predict values for incident report fields are explained below with reference to FIGS. 3-4. While the examples of this disclosure are described with respect to incident reports, the disclosed techniques may be equally applicable to other types of input forms. In general, the techniques of this disclosure may be applied to any type of user-completed input form that has available underlying historical data that may be used to generate a predictive model for input selection fields of the input form (e.g., a user-completed dialog box).

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, customer network 102 represents an enterprise network that could include or be communicatively coupled to one or more local area networks (LANs), virtual networks, data centers and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance may be configured with a client side application interface such as, for example, a web browser executing on a client device (e.g., one of client devices 104A-E of FIG. 1). In this example, an end-user may interact with the web browser to complete a web form associated with defining an incident report. To improve accuracy and acceptability of certain required fields in the incident report, the system may utilize machine learning and prediction techniques to supply proposed values rather than providing the end-user a generic default value. Of course, the user may override the predictive value if that is not acceptable to the end-user. Values that are changed (e.g., overridden) by an end-user may be tracked and utilized to determine accuracy of the model as well as further tune and refine the predictive model. Additionally, particular users who override and exaggerate their own priority (i.e., to get quick response for minor issues that are not actually important to the business) may be identified. Because actual historical data from a particular customer may be used, accuracy of the model may be increased. Data from an actual historical incident has gone through the entire life cycle of the incident. Accordingly, information in the model may have an increased accuracy over generated training data at least because users have interacted with and presumably corrected any erroneous information when processing the actual incident report. Model drift may also be taken into account. The model is based on actual history but may need to be changed over time based on changes at the business. Accordingly, retraining the model may be automatically or periodically triggered to update the model based on real-world changes. Models may be trained in a training instance and then pushed to a customer instance for production use. Details of this will be further discussed below with reference to FIGS. 3-4.

Figure 2:
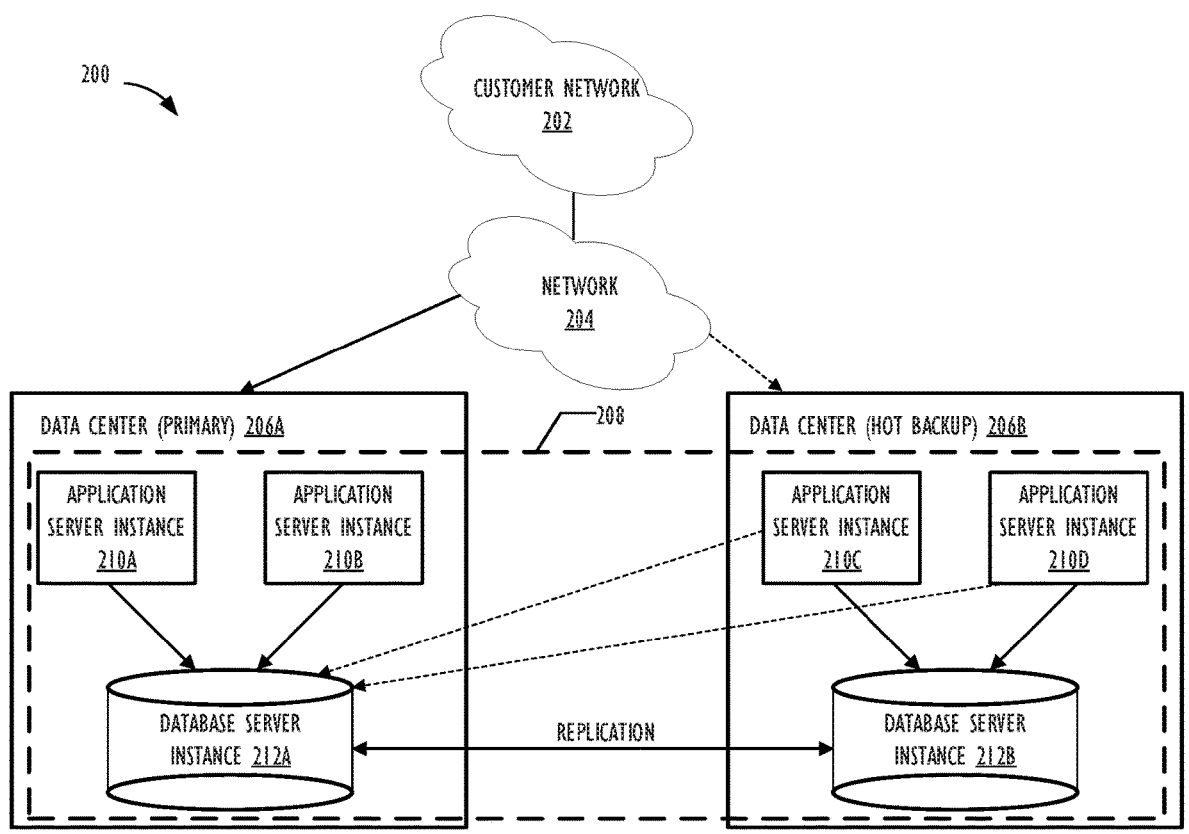
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206A and 206B via network 204. Customer network 202 and network 204 may be substantially similar to customer network 102 and network 108 as described in FIG. 1, respectively. Data centers 206A and 206B can correspond to FIG. 1's data centers 112 located within cloud resources platform/network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210A and 210B and primary database server instance 212A for customer instance 208, and data center 206B acts as a secondary data center to back up primary data center 206A for a customer instance 208. To back up primary data center 206A for customer instance 208, secondary data center 206 includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206a for the customer instance 208 to be diverted to the second data center 206B during a failure and/or maintenance scenario. Using FIG. 2 as an example, if application server instances 210A and 210B and/or primary data server instance 212A fails and/or is under maintenance, data traffic for customer instances 208 can be diverted to secondary application server instances 210C and 210D and secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3A:
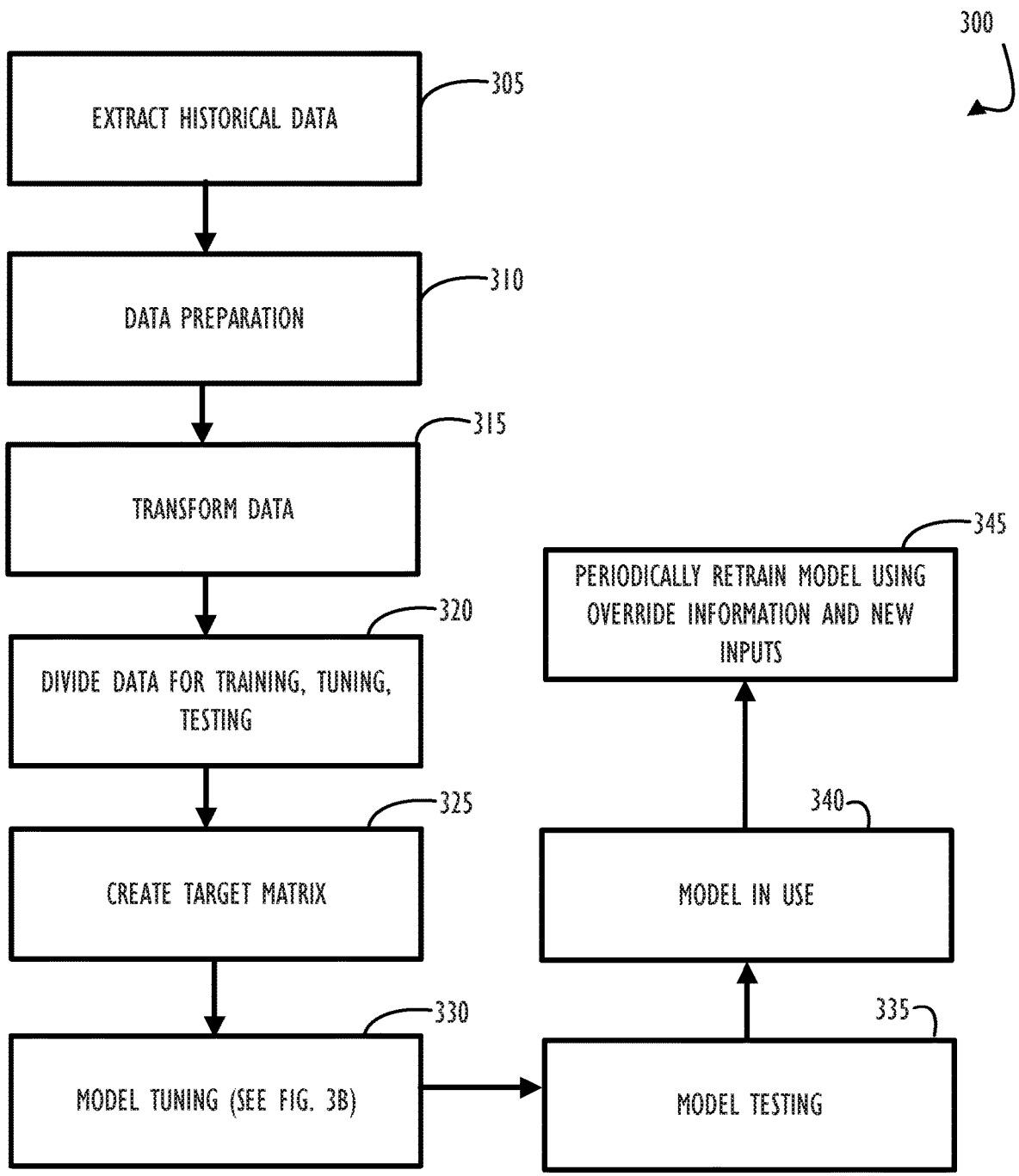
FIGS. 3A-B illustrate flowcharts 300 and 360 respectively, outlining one possible flow for methods of creating and tuning model representative of historical input according to an embodiment of the present disclosure.

Referring now to FIG. 3A, flowchart 300 illustrates one possible flow for creating a predictive model using historical information for use in predicting field values according to some disclosed embodiments. In this example, the model is formed in part by training, tuning, and testing the model using historical data for a particular customer. Historical data is used and may be selected only for previously closed incident reports that have gone through the entire incident management life cycle. Accordingly, the accuracy of the data is expected to be acceptable. Further, data from a particular customer is used in this example because a generic model may not "understand" a cultural vocabulary of an organization. That is, different business entities may, on purpose or by accident, develop a dialect that is unique to their business. For example, there may be terminology unique to their organization when referring to in-house systems and technologies.

Flowchart 300 begins at block 305 where historical data may be extracted from a customer instance. As stated above, the historical data may be limited to a particular customer, a particular time period, and selected for only completed incident reports so the data may represent a high degree of accuracy. At block 310 the data preparation may be performed. Data cleansing may be performed to remove junk characters, correct spelling, and remove user preferences. Data preparation may also include functions to improve consistency of data or create composite information. In one example, there may be records that refer to "e-mail" while other records refer to "email." Changing all records to be consistent and removal of extra non-meaningful characters may increase the ability to form matches across the data. In another example, data may be deduped (removal of duplicates), joined to form new table columns, correlated as time series data, or preprocessed using other methods determined useful for the model. Block 315 indicates that data is transformed using keyword extraction and possibly other techniques. Transformation of the data generally refers to preparing a mathematical model of English sentences. A first example sentence is "I am not able to login to my computer." This would be transformed into "not able," "login," and "computer." N_gram generation may also be a part of data transformation at block 315. Single words represent a 1_gram and a pair of related words represent a 2_gram. In the above example, "not able" is a 2_gram while "login" and "computer" are 1_grams. A second example sentence is "My email is not working." This would be transformed into "email" and "not working." Taking these two sentences as examples the following matrix may be built and each record associated with a target value taken from the historical records:

TABLE 1

| Sentence | X1 email | X2 not | X3 working | X4 able | X5 login | X6 computer | Target |
|---|---|---|---|---|---|---|---|
| 1 |  | X |  | X | X | X | PC |
| 2 | X | X | X |  |  |  | Email |

In this manner, keywords from natural language sentences may be used to create a model. Future incident reports including a natural language sentence in the form of a description of the problem may be parsed and used to predict a value by using the "Target" column of the matrix. Block 320 indicates that extracted historical data may be divided for the different functions associated with model creation. For example, 80% may be used for training, 10% for tuning, and 10% for testing. Block 325 indicates that a target matrix across the data may be created. One very simplified target matrix is shown in Table 1 above for two very simple example sentences. Block 330 represents that model tuning may be required. Details of model tuning are explained in more detail below with reference to FIG. 3B. Block 335 illustrates that a model may be tested to determine its accuracy for example. Block 340 illustrates that after testing the model may be put into production use in a customer instance, for example. Block 345 illustrates that periodic retraining of the model using override information and new inputs may be required to address model drift.

Figure 3B:
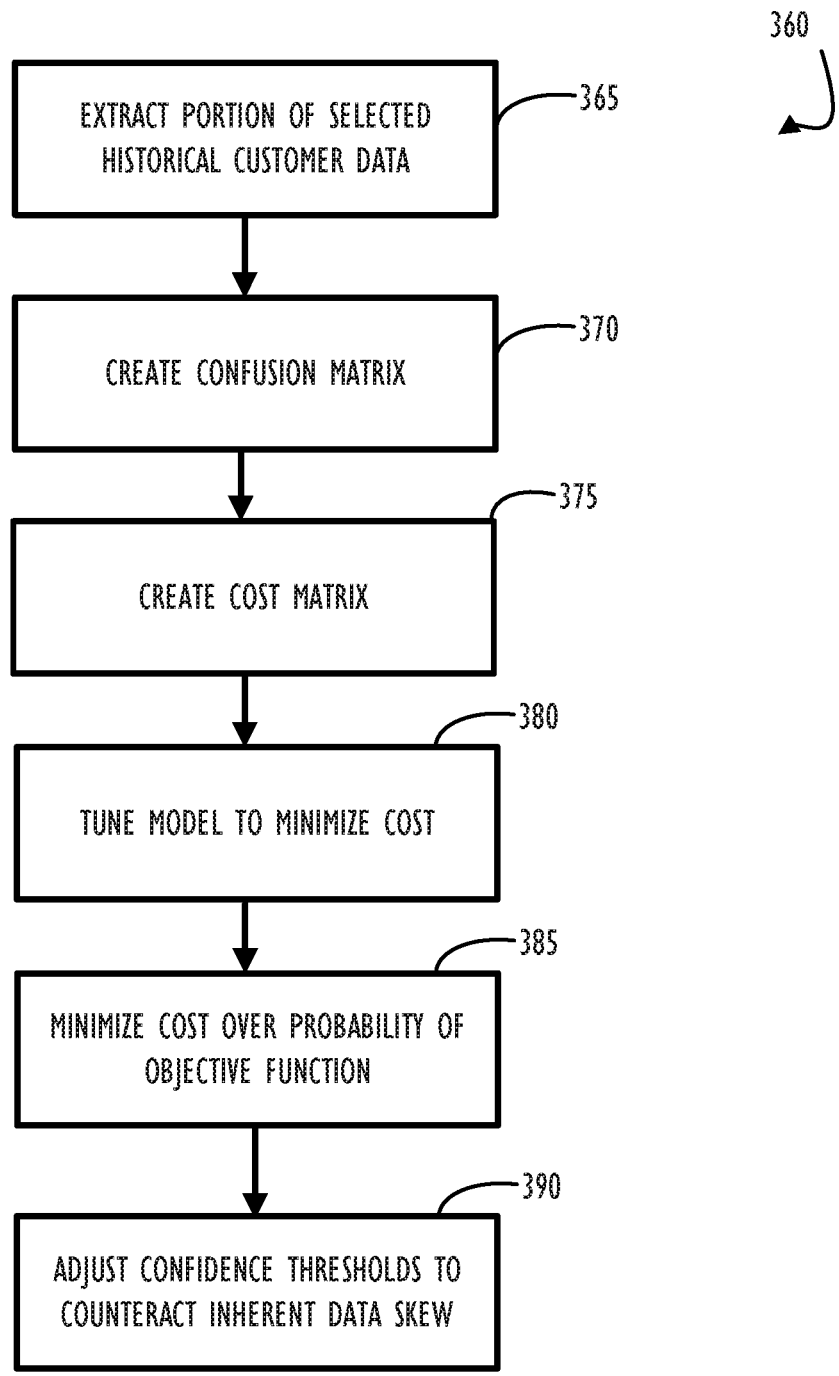

Referring now to FIG. 3B, flowchart 360 illustrates one possible method for tuning of data for a predictive model. Beginning at block 365, a portion of the extracted and cleansed data is selected for tuning. Block 370 indicates that a confusion matrix may be created. A confusion matrix monitors predicted values against actual values to assist with accuracy. An example of a very simplified confusion matrix is shown here for 1,000 records where 990 should be assigned to "EMAIL" and 10 should be assigned to "PC." The counts reflect the prediction results of the model at this phase of tuning.

|  | EMAIL | PC | Actual |
|---|---|---|---|
| EMAIL | Count = 950 | Count = 40 | 990 |
| PC | Count = 10 | Count = 0 | 10 |

This table gives us a view into the accuracy of the model. From it we can see that 40 of the actual EMAIL records were assigned incorrectly to PC and 10 of the actual PC records were assigned incorrectly to EMAIL. Block 375 indicates that a cost matrix may be created. Below is a simplified cost matrix continuing the above simplified example. We have a cost where there is an incorrect assignment and no cost (represented by 0) where the assignment was correctly made.

| EMAIL | 0 | Cost 1 |
|---|---|---|
| PC | Cost 2 | 0 |

Cost 1 represents the cost of misclassification of EMAIL to PC and Cost 2 represents the cost of misclassification of PC as EMAIL. Total cost in this example is therefore 40 Cost 1 plus 10 Cost 2. Block 380 indicates that we can tune the model to minimize cost. As illustrated at block 385 we can minimize cost over probability of the objective function. Block 390 indicates that we can adjust the confidence thresholds to counteract the data skew caused at least in part because there are so many more actual EMAIL records (i.e., 990) than actual PC records (i.e., 10). For example, we can adjust the threshold of classification to PC down to try to capture the actual 10 PC records and possibly increase the threshold of classification to EMAIL. In any case, by adjusting these thresholds and running the test again we can determine which thresholds result in the total cost being minimized. We can optimize for N–1 thresholds because the sum of all thresholds should be equal to 1. In use, we could monitor form input as it is being typed and dynamically readjust the predicted values of selectable options on any web form. Further, input may not come from an actual human end-user and may be generated by chat bots, email messages, or the like.

Figure 4:
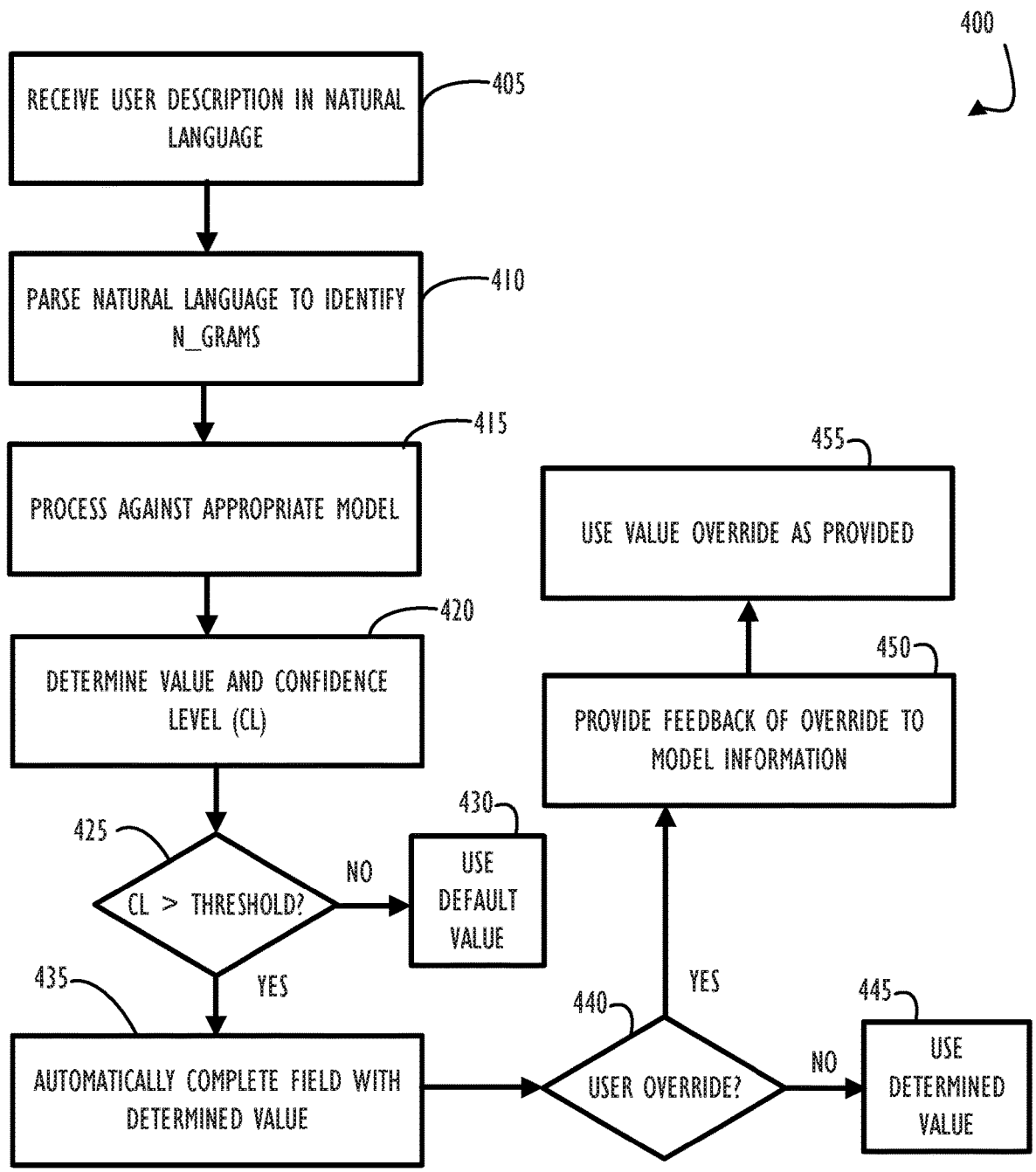
FIG. 4 illustrates a flowchart 400 representing one possible flow for performing methods of using a model to automatically assist in completion of fields using natural language text input (e.g., short description) according to one or more disclosed embodiments.

Referring now to FIG. 4, flowchart 400 illustrates one possible flow for automatic completion of fields based on analysis according to one or more disclosed embodiments. Beginning at block 405 a natural language input is received. In this example a description field is used, but any field may be used without departing from the scope of this disclosure. Block 410 indicates that the natural language input may be parsed to identify N_grams as discussed above. Block 415 indicates that the parsed input may then be processed against a model to determine a value and a confidence level (block 420). Decision 425 illustrates that the confidence level may be checked against a threshold. If the value does not satisfy the threshold (NO prong of decision 425) flow continues to block 430 where a default value such as a generic default value may be used. If the value satisfies the threshold (YES prong of decision 425) flow continues to block 435 where the field may be automatically completed with the determined target value (i.e., predicted value based on model). Decision 440 determines if the user changes the predicted value. If not (NO prong of decision 440) flow continues to block 445 and the determined predicted value based on the model is used. If the user does change the value (e.g., override it), the YES prong of decision 440, flow continues to block 450 where feedback regarding the change may be used to further refine the model and prediction method. Flow continues to block 455 where the value as provide by the user is used for the incident report.

In general model usability may be a determining factor in accuracy for predicted values. Some customers' actual historical data may not have a frequency distribution that allows for creation of a feasible model. Accordingly, it is important to consider if a model can be built based on the input data set. Given a dataset, it may be determined if a non-naïve model that is substantially better than a naïve model can be built. In one embodiment we could run a controlled experiment that produces data for hypothesis testing as explained here. First, randomly split the dataset into two parts: training and testing data. On the training data, build two models including a naïve/simple model and a non-naïve model. The naïve/simple models are ZeroR or OneR. ZeroR is the simplest classification method which relies on the target and ignores all predictors. A ZeroR classifier simply predicts the majority category (class). OneR, short for "One Rule," is a simple, yet accurate, classification algorithm that generates one rule for each predictor in the data, then selects the rule with the smallest total error as its "one rule." To create a rule for a predictor, a frequency table for each predictor against the target may be constructed. The non-naïve model is logistic regression. Next, we apply the two models to the test data. With the actual class and two predictions across the entire test data, we can create the 2 by 2 concordance-discordance confusion matrix where: $N_{00}$ represents the number of examples correctly predicted by both models, $N_{01}$ represents the number of examples correctly predicted by the naïve model but incorrectly by the non-naïve model, $N_{10}$ represents the number of examples incorrectly predicted by the naïve model but correctly predicted by the non-naïve model, and $N_{11}$ represents the number of examples incorrectly predicted by both models. Using the confusion matrix we can compute a statistical test (McNemar's test) as well as computing the signed difference in prediction errors. A large value for McNemar's test indicates that the null hypothesis (the two classifiers have the same error rate) can be rejected. A signed difference in prediction errors can confirm that the non-naïve model is more accurate. In this example, training data and testing data must remain the same for the two models. In some embodiments, this experiment on the model can be added as a new task as part of model validation or may be executed independently as part of the model creation flow.

Figure 5:
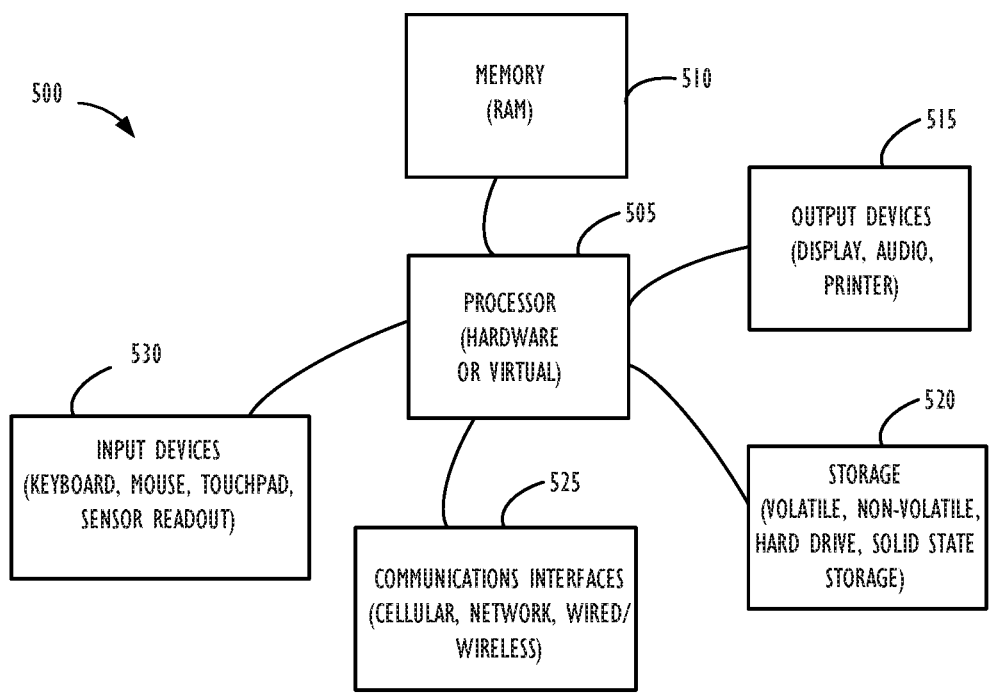
FIG. 5 illustrates a high-level block diagram 500 of a processing device (computing system) that may be used to implement one or more disclosed embodiments.

FIG. 5 illustrates a high-level block diagram 500 of a processing device (computing system) that may be used to implement one or more disclosed embodiments (e.g., service provider cloud infrastructure 110, client devices 104A-104E, server instances 112, data centers 206A-206B, etc.).

For example, computing device 500 illustrated in FIG. 5 could represent a client device or a physical server device and include either hardware or virtual processor(s) depending on the level of abstraction of the computing device. In some instances (without abstraction) computing device 500 and its elements as shown in FIG. 5 each relate to physical hardware and in some instances one, more, or all of the elements could be implemented using emulators or virtual machines as levels of abstraction. In any case, no matter how many levels of abstraction away from the physical hardware, computing device 500 at its lowest level may be implemented on physical hardware. As also shown in FIG. 5, computing device 500 may include one or more input devices 530, such as a keyboard, mouse, touchpad, or sensor readout (e.g., biometric scanner) and one or more output devices 515, such as displays, speakers for audio, or printers. Some devices may be configured as input/output devices also (e.g., a network interface or touchscreen display). Computing device 500 may also include communications interfaces 525, such as a network communication unit that could include a wired communication component and/or a wireless communications component, which may be communicatively coupled to processor 505. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 5, processing device 500 includes a processing element such as processor 505 that contains one or more hardware processors, where each hardware processor may have a single or multiple processor cores. In one embodiment, the processor 505 may include at least one shared cache that stores data (e.g., computing instructions) that are utilized by one or more other components of processor 505. For example, the shared cache may be a locally cached data stored in a memory for faster access by components of the processing elements that make up processor 505. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 5, the processing elements that make up processor 505 may also include one or more other types of hardware processing components, such as graphics processing units (GPUs), application specific integrated circuits (ASICs), field-programmable gate arrays (FPGAs), and/or digital signal processors (DSPs).

FIG. 5 illustrates that memory 510 may be operatively and communicatively coupled to processor 505. Memory 510 may be a non-transitory medium configured to store various types of data. For example, memory 510 may include one or more storage devices 520 that comprise a non-volatile storage device and/or volatile memory. Volatile memory, such as random access memory (RAM), can be any suitable non-permanent storage device. The non-volatile storage devices 520 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 520 may be used to store overflow data if allocated RAM is not large enough to hold all working data. The non-volatile storage devices 520 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 505. In one embodiment, the compiling process of the software program may transform program code written in a programming language to another computer language such that the processor 505 is able to execute the programming code. For example, the compiling process of the software program may generate an executable program that provides encoded instructions (e.g., machine code instructions) for processor 505 to accomplish specific, non-generic, particular computing functions.

After the compiling process, the encoded instructions may then be loaded as computer executable instructions or process steps to processor 505 from storage 520, from memory 510, and/or embedded within processor 505 (e.g., via a cache or on-board ROM). Processor 505 may be configured to execute the stored instructions or process steps in order to perform instructions or process steps to transform the computing device into a non-generic, particular, specially programmed machine or apparatus. Stored data, e.g., data stored by a storage device 520, may be accessed by processor 505 during the execution of computer executable instructions or process steps to instruct one or more components within the computing device 500.

A user interface (e.g., output devices 515 and input devices 530) can include a display, positional input device (such as a mouse, touchpad, touchscreen, or the like), keyboard, or other forms of user input and output devices. The user interface components may be communicatively coupled to processor 505. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 500 may comprise other components well known in the art, such as sensors, powers sources, and/or analog-to-digital converters, not explicitly shown in FIG. 5.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

The subject matter of this disclosure may be applicable to numerous use cases that have not been explicitly discussed here but are contemplated by this disclosure. For example, the provisional applications filed by the same applicant on May 4, 2017 and May 5, 2017 entitled "Service Platform and use thereof" have further examples. The U.S. Provisional applications given filing Ser. Nos. 62/501,646; 62/501,657; 62/502,258; 62/502,308; and 62/502,244 are hereby incorporated by reference.

What is claimed is:

1. A cloud-based computer system, comprising:
  a memory partition;
  a network interface communicatively coupled to one or more processing units and the memory partition, wherein the memory partition comprises computer instructions that when executed by the one or more processing units cause the cloud-based computer system to:
    provide a hosted client instance communicatively coupled, via the network interface, with a remote client device;
    receive a request from the remote client device for an incident report for reporting an information technology (IT) issue with one or more hardware resources or one or more software resources within a computing network;
    receive information in natural language text regarding the IT issue from an input field in the incident report;
    parse the natural language text to identify one or more N Grams;
    process the identified one or more N-Grams against a model to determine a predicted value and a confidence level of the predicted value for one or more incomplete input fields in the incident report;
    determine that the confidence level of the predicted value is above a confidence level threshold associated with the one or more incomplete input fields; and
    send the predicted value to the remote client device for automatic completion of the one or more incomplete input fields in the incident report in place of the remote client device providing one or more generic default values for completion of the one or more incomplete input fields.

2. The cloud-based computer system of claim 1, wherein the computer instructions cause the cloud-based computer system to receive an indication of user-override for the predicted value and use the indication of user-override to retrain the model.

3. The cloud-based computer system of claim 1, wherein the computer instructions cause the cloud-based computer system to periodically retrain the model using information obtained after initial use of the model.

4. The cloud-based computer system of claim 1, wherein the information in natural language text regarding the IT issue comprises a short description field generically describing an incident.

5. The cloud-based computer system of claim 1, wherein the one or more incomplete fields in the incident report is a priority field.

6. The cloud-based computer system of claim 1, wherein the one or more incomplete fields in the incident report is a classification field.

7. The cloud-based computer system of claim 1, wherein the one or more incomplete fields in the incident report is an assignment field.

8. A cloud-based computer system, comprising:
a memory partition;
a network interface communicatively coupled to one or more processing units and the memory partition, wherein the memory partition comprises computer instructions that when executed by the one or more processing units cause the cloud-based computer system to:
provide a hosted client instance communicatively coupled, via the network interface, with a remote client device;
receive a request to create a model configured to assist in machine learning prediction of input values;
extract historical data representative of completed incident reports associated with the hosted client instance;
process the extracted historical data to create pre-processed model input data;
transform the pre-processed model input data using transformation techniques to create transformed model data;
partition the transformed model data into a training data set, a tuning data set, and a testing data set;
create a target matrix from the training data set, the target matrix comprising N-Gram values associated with a target identifier as indicated by the extracted historical data;
apply the target matrix to natural language text of an incident report associated with reporting an information technology (IT) issue with one or more hardware resources or one or more software resources within a computer network, wherein applying the target matrix to the natural language text comprises determining a predicted value for one or more incomplete input fields in the incident report; and
automatically complete the one or more incomplete input fields in the incident report with the predicted value in place of providing one or more generic default values for completion of the one or more incomplete input fields.

9. The cloud-based computer system of claim 8, wherein the request to create the model comprises a time-frame for which to extract the historical data.

10. The cloud-based computer system of claim 8, wherein the computer instructions to process the extracted historical data comprise instructions to remove junk characters.

11. The cloud-based computer system of claim 8, wherein the computer instructions to process the historical data comprise instructions to dedupe redundant information.

12. The cloud-based computer system of claim 8, wherein the computer instructions to process the extracted historical data comprise instructions to adjust different references to a common item to a consistent reference to the common item.

13. The cloud-based computer system of claim 8, wherein the transformation techniques include keyword extraction.

14. The cloud-based computer system of claim 13, wherein the transformation techniques include preparing a mathematical model of English sentences in the pre-processed model input data.

15. The cloud-based computer system of claim 14, wherein the mathematical model of English sentences is based at least in part on N-Gram generation.

16. The cloud-based computer system of claim 15, wherein both 1-gram and 2-gram values are used in the mathematical model.

17. The cloud-based computer system of claim 8, wherein the training data set substantially comprises 80 percent of the transformed model data and each of the tuning data set and the testing data set comprises substantially 10 percent of the transformed model data.

18. The cloud-based computer system of claim 8, wherein the computer instructions cause the cloud-based computer system to:
create a confusion matrix reflecting predicted values against actual values using the tuning dataset, the confusion matrix indicating an accuracy of the model.

19. The cloud-based computer system of claim 18, wherein the computer instructions cause the cloud-based computer system to:
create a cost matrix associated with an error rate correlated with the accuracy of the model.

20. The cloud-based computer system of claim 19, wherein the computer instructions cause the cloud-based computer system to:
calculate a total cost based on the cost matrix and cost of misclassification; and
iteratively adjust confidence thresholds within the model and recalculate the total cost to identify the confidence thresholds associated with a minimized cost.

* * * * *